Figure 1:
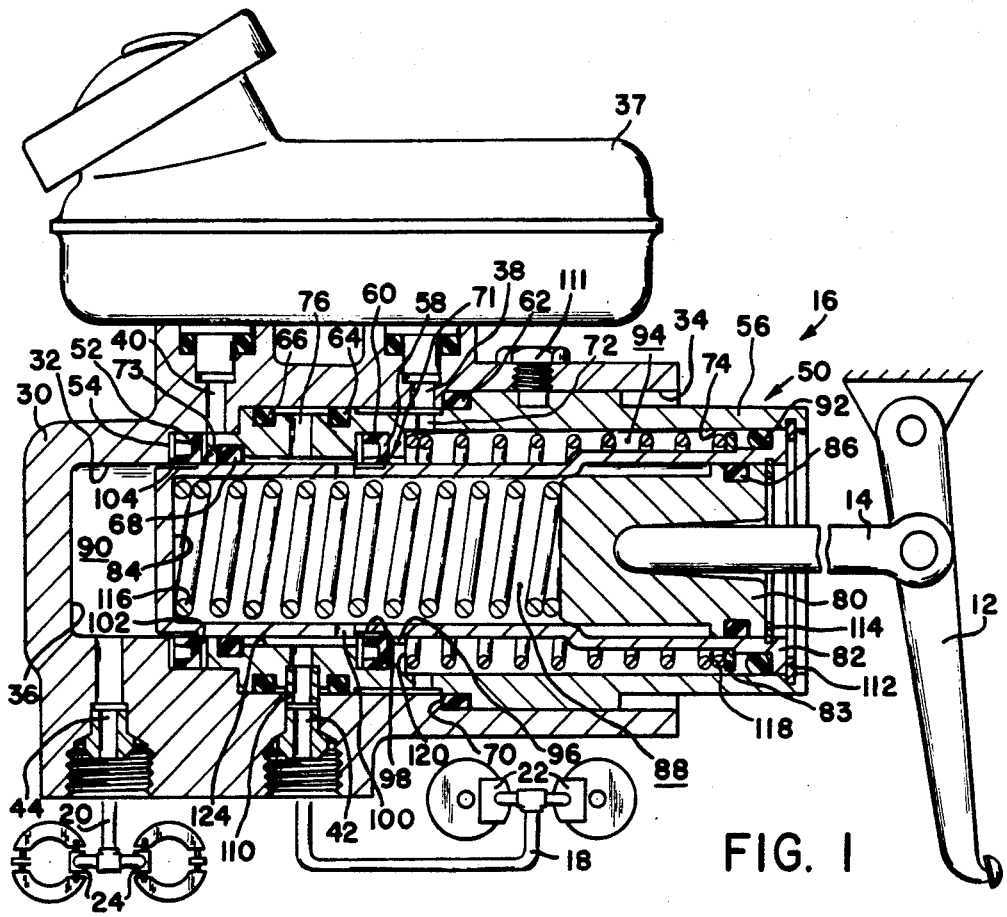

United States Patent [19]
Bach et al.

[11] Patent Number: 4,514,982
[45] Date of Patent: May 7, 1985

[54] MASTER CYLINDER

[75] Inventors: Lloyd G. Bach, South Bend, Ind.; Robert F. Gaiser, Stevensville, Mich.

[73] Assignee: Allied Corporation, Morristown, N.J.

[21] Appl. No.: 353,320

[22] Filed: Mar. 1, 1982

[51] Int. Cl.³ ............................................. B60T 11/20
[52] U.S. Cl. ........................................ 60/562; 60/589
[58] Field of Search ................. 60/562, 589, 581, 585, 60/588; 92/171

[56] References Cited

U.S. PATENT DOCUMENTS

| 3,060,691 | 10/1962 | Davis | 60/562 |
| 3,415,060 | 12/1968 | Belart | 60/581 |
| 3,618,320 | 11/1971 | Ingram | 60/562 |
| 3,946,563 | 3/1976 | Rivetti | 60/562 |
| 4,091,619 | 5/1978 | Carré | 60/562 |
| 4,152,897 | 5/1979 | Falk | 60/592 |
| 4,161,105 | 7/1979 | Hagiwara | 60/562 |
| 4,249,381 | 2/1981 | Gaiser | 60/562 |

FOREIGN PATENT DOCUMENTS

| 45232 | 2/1982 | European Pat. Off. | 60/562 |
| 69662 | 11/1954 | France | 60/562 |
| 887631 | 1/1962 | United Kingdom | 60/562 |

Primary Examiner—Abraham Hershkovitz
Attorney, Agent, or Firm—Larry J. Palguta; Ken C. Decker

[57] ABSTRACT

A master cylinder includes a housing (30) with a stepped bore (32) receiving a sleeve assembly (50). A pair of pistons (80, 82) are disposed within the stepped bore (32) and one (82) of the pair of pistons defines portions of compensation passages between a reservoir (37) and a pair of pressure chambers (88, 90). The one piston (82) is movable to simultaneously control communication through the compensation passages.

7 Claims, 2 Drawing Figures

U.S. Patent  May 7, 1985  4,514,982

MASTER CYLINDER

This invention relates to a master cylinder which generates fluid pressure during braking to communicate fluid pressure to a pair of brake circuits.

A master cylinder having a housing (30) with a bore (32) receiving a pair of movable pistons (80, 82), the pair of pistons (80, 82) cooperating with each other and with the housing to substantially define a pair of pressure chambers (88, 90), one (80) of the pair of pistons being adapted to connect with an input member (14) which is operable during braking to move the one piston (80) within the housing bore, and a sleeve assembly (50) fixedly disposed within the housing bore includes a pair of sealing means (58, 52) partially defining passages (71, 73) leading to the pair of pressure chambers, respectively, when the other piston (82) is in a rest position.

In U.S. Pat. No. 4,249,381 a displacement master cylinder includes a pair of pistons, each defining notches to form compensation paths from a reservoir to a respective pressure chamber. Consequently, both pistons require fabrication for notches. Also the sleeve and bearing constitute separate parts which increase the number of parts to be assembled.

The master cylinder of the present invention is characterized in that said other piston (82) including (98, 100, 104) means cooperating with said sleeve assembly to substantially define both passages (71, 73) leading to the pair of pressure chambers (88, 90) and movement of said other piston (82) relative to said sleeve assembly (50) simultaneously controls communication through said passages (71, 73) to said pair of pressure chambers (88, 90).

One advantage resulting from the invention is that only one piston need be fabricated with notches to control communication via a pair of compensation passages to the pair of respective pressure chambers. Also, with the sleeve slidably supporting one piston directly and another piston indirectly, the number of parts in a master cylinder is reduced.

Figure 2:
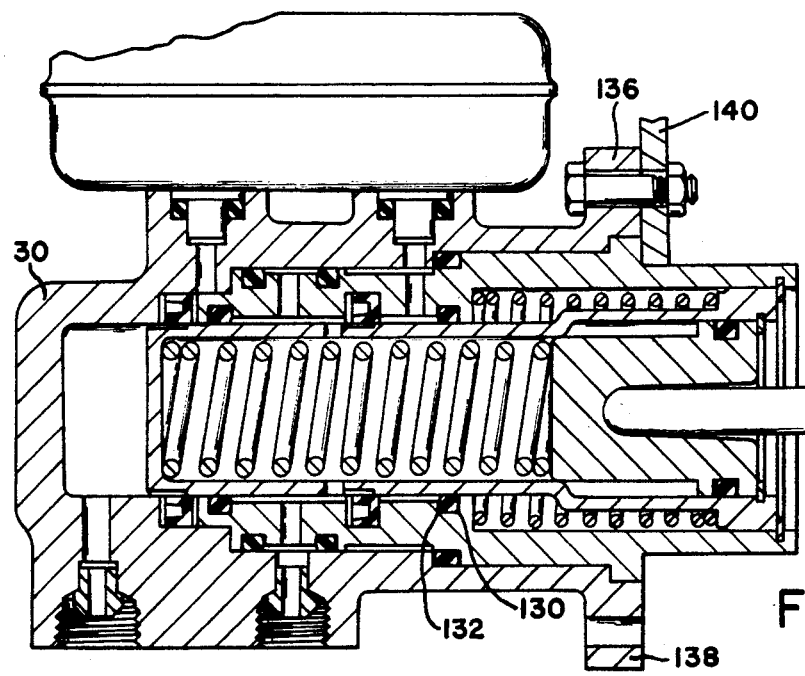

The invention will now be described with reference to the accompanying drawings wherein:

FIG. 1 is a schematic illustration of a brake system showing a master cylinder constructed in accordance with the present invention; and FIG. 2 is a view similar to FIG. 1 showing an alternative embodiment of the present invention.

A brake system includes a pedal 12 which is movable by a vehicle operator's foot during a brake application. The pedal 12 is coupled to an input member 14 which, in turn, is coupled to master cylinder 16. A pair of conduits 18 and 20 communicate the master cylinder 16 with brake assemblies 22 and 24 so that fluid pressure generated in the master cylinder 16 will be communicated with the brake assemblies 22 and 24. Although the brake system of FIG. 1 shows an axle to axle brake assembly arrangement, it is feasible to utilize the master cylinder 16 with a cross-split arrangement.

The master cylinder 16 includes a housing 30 made from die-cast aluminum, magnesium or cast iron. The housing forms a stepped bore 32 leading to an opening 34 opposite from an end wall 36. A plastic reservoir 37 is attached to the housing 30 although the housing could integrally form a reservoir for the purpose of carrying brake fluid therein. The housing defines a pair of inlet ports 38 and 40 and a pair of outlet ports 42 and 44. The outlet ports 42 and 44 communicate with the brake circuits 18 and 20, respectively, while the inlet ports 38 and 40 communicate fluid from the reservoir to the stepped bore 32.

A sleeve assembly 50 is fixedly disposed within the stepped bore 32. The sleeve assembly 50 includes a first lip seal 52 facing a shoulder 54 of the stepped bore 32, a cylindrical sleeve 56, a second lip seal 58 disposed within a recess 60 on the sleeve 56, and a plurality of O ring seals 62, 64, 66 and 68. The seal 62 is disposed in abutment with a shoulder 70 on the stepped bore 32 while the seals 64, 66, and 68 are carried within recesses on the sleeve 56. An opening 72 on the sleeve 56 communicates fluid from the reservoir 37 to a bore 74 formed by the sleeve 56 and an opening 76 on the sleeve 56 communicates the bore 74 with the outlet port 42. The opening 72 is positioned on the sleeve 56 between the seals 62 and 64 and the opening 76 is positioned on the sleeve 56 between the seals 64 and 66.

A pair of pistons 80 and 82 are received within the housing stepped bore 32. The piston 80 is adapted to connect with the input member 14 and the piston 82 sealingly and slidably engages the wall of the bore 74 for the sleeve 56. The piston 82 is U shaped in cross section so as to define a cavity 84 for receiving the piston 80. The piston 80 carries a seal 86 engaging the piston 82 such that a primary pressure chamber 88 is defined within the cavity 84. The piston 82 engages the seal 52 to define a secondary pressure chamber 90 adjacent the end wall 36. The piston 82 carries a seal 92 adjacent the right end of the sleeve 56 to seal a first compensation passage generally identified at 71 and defined from opening 72 or reservoir 37 to pressure chamber 88 via a first clearance 94 between the sleeve 56 and the piston 82 a second clearance 96 adjacent recess 60, at least one notch 98 on the intermediate portion of piston 82 and an aperture 100 on the piston 82 leading to the pressure chamber 88. In the rest position shown in FIG. 1, the pressure chamber 88 and first compensation passage also communicate with the opening 76 to permit fluid communication from the reservoir 37 to the brake circuit 18. A second compensation passage generally identified at 73 extends from the reservoir 37 to the pressure chamber 90 and is defined by at least one groove 102 at the left end of sleeve 56 and at least one notch 104 at the left end of the piston 82. In the alternative, the seal 52 could be provided with protrusions forming passages with the left end of the sleeve. In the rest position the reservoir 37 is also in fluid communication with the brake circuit 20 via the pressure chamber 90.

In order to fixedly position the sleeve assembly 50 within the housing stepped bore 32, the outlet port 42 receives a fitting 110 which extends radially inwardly to fit within the opening 76. Alternatively, a stop bolt 111 could extend through the housing to engage the sleeve 56.

With the sleeve assembly 50 extending outwardly from the housing opening 34 to engage the piston 82 and carry a stop 112 in abutment with the piston 82, it is possible to provide a relative short axial length for the housing 30. The piston 82 also extends outwardly of the housing opening 34 to engage the piston 80 and carry a stop 114 in abutment with the piston 80. Consequently, both pistons 80 and 82 are completely disposed axially within the sleeve assembly 50 at the open end 34.

A first spring 116 extends between the pistons 80 and 82 within the cavity 84 to bias the piston 80 to its rest position engaging stop 114. A second spring 118 extends between a sleeve shoulder 120 and the piston 82 via a snap washer 83 to bias the latter to its rest position engaging stop 112.

During a brake application, the piston 80 is moved to the left to compress spring 118 so that the piston 82 is also moved to the left. As the piston 82 moves, the notches 98 and 104 are moved to the left of seals 58 and 52 so that communication via the compensation passages is closed. After predetermined contraction for spring 118, the piston 80 moves relative to the piston 82 to contract the volume of the pressure chamber 88 and contract the spring 116 to pressurize the fluid contained therein. This fluid pressure is communicated from the chamber 88 to the brake circuit 18 via the aperture 100, a third clearance 124 between the sleeve 56 and the second piston 82 intermediate seals 58 and 68, the opening 76, the fitting 110 and the outlet port 42. Similarly, the moving piston 82 contracts the volume of chamber 90 to pressurize the fluid contained therein and this fluid pressure is communicated directly to brake circuit 20 via outlet port 44. The volume of clearance 74 is also contracted during braking; however, the clearance is continuously open to the reservoir 37 via inlet port 38, so that no fluid pressure will be generated therein to oppose movement of piston 82.

In the alternative embodiment of FIG. 2, the sleeve 56 is modified to include an additional recess 130 for carrying an O ring seal 132. The seal 132 is similar to the seal 92 except that it is fixed to the sleeve 56 rather than being movably carried with the piston 82. With the seal 132 in the recess 130, the right end of the piston 82 merely slidably engages the sleeve 56 without any sealing relation. In addition, the housing 30 in FIG. 2 is provided with radially extending flanges 136 and 138 which are apertured to receive bolts to secure the housing to a firewall 140 or suitable mounting plate on a vehicle. The sleeve extends through the firewall and is provided with a flange 142 which is trapped between the housing and the firewall within a housing recess 144, when the housing is secured to the latter in order to fixedly disposed the sleeve assembly within the housing stepped bore.

We claim:

1. A master cylinder having a housing with a bore receiving a pair of movable pistons, the pair of pistons cooperating with each other and with the housing to substantially define a pair of pressure chambers, one of the pair of pistons being adapted to connect with an input member which is operable during braking to move the one piston within the housing bore, and a sleeve assembly fixedly disposed within the housing bore includes a pair of sealing means partially defining passages leading to the pair of pressure chambers, respectively, when the other piston is in a rest position, said other piston including means cooperating with said pair of sealing means to substantially define both passages leading to the pair of pressure chambers and movement of said other piston relative to said pair of sealing means simultaneously controls communication through said passages to said pair of pressure chambers, and said other piston cooperating with said sleeve assembly to define at least three sealing interfaces controlling fluid communication between said sleeve assembly and said other piston, two of said sealing interfaces controlling fluid communication to respective pressure chambers and the third sealing interface preventing fluid communication between said chambers.

2. The master cylinder of claim 1 said one piston sealingly engages said other piston and said other piston sealingly engages said sleeve assembly.

3. The master cylinder of claim 1 in which a first resilient member extends between said pair of pistons and a second resilient member extends between said sleeve assembly and said other piston, said second resilient member extending outwardly of said housing bore when said other piston is in its rest position.

4. The master cylinder of claim 1 in which said other piston cooperates with said sleeve assembly to define four sealing interfaces therebetween to control fluid communication between said sleeve assembly and said other piston.

5. A master cylinder having a housing with a bore receiving a pair of movable pistons, the pair of pistons cooperating with each other and with the housing to substantially define a pair of pressure chambers, one of the pair of pistons being adapted to connect with an input member which is operable during braking to move the one piston within the housing bore, and a sleeve assembly fixedly disposed within the housing bore includes a pair of sealing means partially defining passages leading to the pair of pressure chambers, respectively, when the other piston is in a rest position, said other piston including means cooperating with said pair of sealing means to substantially define both passages leading to the pair of pressure chambers and movement of said other piston relative to said pair of sealing means simultaneously controls communication through said passages to said pair of pressure chambers, said one piston sealingly engaging said other piston to substantially enclose one of the pair of pressure chambers, and said other piston sealingly engaging said sleeve assembly at a first location to control fluid communication to said one pressure chamber and at a second location to control fluid communication to the other of said pair of pressure chambers.

6. A master cylinder having a housing with a bore receiving a pair of movable pistons, the pair of pistons cooperating with each other and with the housing to substantially define a pair of pressure chambers, one of the pair of pistons being adapted to connect with an input member which is operable during braking to move the one piston within the housing bore, and a sleeve assembly fixedly disposed within the housing bore includes a pair of sealing means partially defining passages leading to the pair of pressure chambers, respectively, when the other piston is in a rest position, said other piston including means cooperating with said pair of sealing means to substantially define both passages leading to the pair of pressure chambers and movement of said other piston relative to said pair of sealing means simultaneously controls communication through said passages to said pair of pressure chambers, and said other piston cooperating with said sleeve assembly to define at least three sealing interfaces controlling fluid communication between said sleeve assembly and said other piston, the housing bore leading to an opening and said sleeve assembly and pair of pistons extending outwardly from said opening when said pair of pistons are in a rest position.

7. A master cylinder having a housing with a bore receiving a pair of movable pistons, the pair of pistons cooperating with each other and with the housing to substantially define a pair of pressure chambers, one of the pair of pistons being adapted to connect with an input member which is operable during braking to move the one piston within the housing bore, and a sleeve assembly fixedly disposed within the housing bore includes a pair of sealing means partially defining passages leading to the pair of pressure chambers, respectively, when the other piston is in a rest position, said other piston including means cooperating with said pair of sealing means to substantially define both passages leading to the pair of pressure chambers and movement of said other piston relative to said pair of sealing means simultaneously controls communication through said passages to said pair of pressure chambers, and said other piston cooperating with said sleeve assembly to define at least three sealing interfaces controlling fluid communication between said sleeve assembly and said other piston, said one piston sealingly engaging said other piston and said other piston sealingly engaging said sleeve assembly, the sealing engagements between said other piston and said sleeve and one piston being located outside of the housing bore when the pair of pistons are in rest position.

* * * * *